(No Model.)

C. F. LOOMIS.
FISH LINE REEL.

No. 459,511. Patented Sept. 15, 1891.

Witnesses:
Raphael Netter
Robt. F. Gaylord

Inventor
Charles F. Loomis
by Allan W. Paige
Attorney.

UNITED STATES PATENT OFFICE.

CHARLES F. LOOMIS, OF BIRMINGHAM, CONNECTICUT.

FISH-LINE REEL.

SPECIFICATION forming part of Letters Patent No. 459,511, dated September 15, 1891.

Application filed December 22, 1890. Serial No. 375,412. (No model.)

*To all whom it may concern:*

Be it known that I, CHARLES F. LOOMIS, a citizen of the United States, residing at Birmingham, in the county of New Haven and State of Connecticut, have invented a new and useful Improvement in Fish-Line Reels, of which the following is a description, reference being had to the accompanying drawings.

The present improvement relates to reels for use on fishing-rods or wherever it may be desired to use a reel for carrying and manipulating a fishing-line.

The object of the invention is to produce a reel that will permit ventilation of the line, as also the easy drying of the same when wound on the reel while wet.

Another object of the invention is to so construct the reel that the sound of the click shall not be transmitted to the line when the same is in the water and being used for fishing.

The invention consists of a reel having a hollow or cylindrical shaft or axis, which is open at one or both ends, and is also perforated laterally, the inner faces of the spool of which are also radially corrugated.

Figure 1:
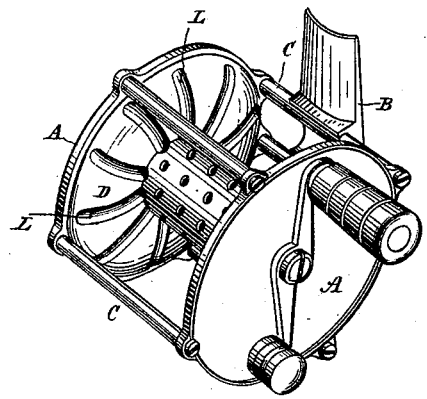
Figure 2:
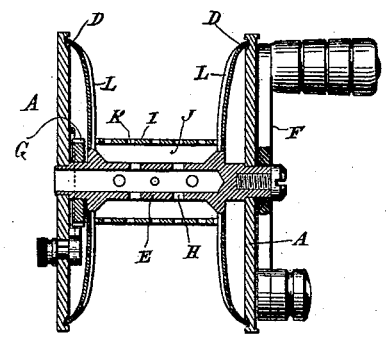

Referring to the drawings, Figure 1 shows a perspective view of a single-acting-click reel of common form in inverted position, which has spool-heads and a spool-shaft or axis constructed in accordance with my invention. Fig. 2 shows a central section of the reel and its spool.

Referring to the views in detail, A represents the side plates of the frame of the reel; B, the bar by which the reel is secured to a fishing-rod and to which the side plates are attached by two of the cross-rods C, which also hold the side plates in relative position.

D represents the disk-heads of the spool. These heads are concavo-convex in form, and are permanently attached at proper distance apart to the hollow cylindrical shaft or axis E, which is pivotally supported in and between the side plates A. At one end of this shaft is attached the handle F, or in the case of a multiplying-reel one of the gears of the multiplying system would be attached to this end of the shaft. The other end of this shaft, which covers the click-wheel G, is passed through the side plate in which it is journaled, and is left open to permit a free circulation of air along the length of the shaft between the spool-heads. The shaft is also perforated laterally to its axis by various holes H.

I is a sleeve supported on hubs on the shaft E and between the spool-heads, and this sleeve is somewhat larger interiorly than is the shaft exteriorly, so that an annular chamber J is formed between the two. The sleeve I is also pierced laterally by holes K.

L indicates radial grooves or corrugations cut or formed in the inner face of the spool-heads D and extending to beneath the sleeve I, so as to communicate with chamber J. These corrugations prevent the ends of the coil of line touching and packing against the whole of the inner surface of the spool-heads. The ends of such coil will bear only upon the portions of these faces between the grooves. The line is attached to and wound upon the sleeve I in the manner usual with the common form of reels. By this construction air has ready access to and along the interior of the coil of line upon the reel-spool, and working out radially dries the line if damp, and prevents it when left wound upon the reel from molding and rotting, or for other reasons losing its tensional life and elastic strength. Also the ends of the coil of line are ventilated along the radial corrugations, and thus assist its drying. The line might of course be coiled on the cylindrical axis E of the spool; but I prefer to employ in conjunction with the axis the sleeve I. The arrangement permits the presence of a larger body of air inside the coil of line than if the line were coiled on the shaft, and the rapid revolution of the axis and its sleeve with the body of air between them tends to force the air radially out through the layers of coiled line in a way not possible were the sleeve not employed. Another important advantage of this construction is that when a spool having corrugated heads and a hollow shaft is used in a click-reel the transmission of the sound of the click along the taut line to the water, as when trolling, skittering, or fly-casting, is very much lessened, if not entirely prevented, by the presence of a body of air in the axis of the coils of line and by reason of the small bearing-surface of the coil of line on the spool-heads.

The hollow shaft herein shown and described may be modified and adapted to various forms of reel frames and spools, and so I do not limit myself to the exact construction illustrated.

What I claim as my invention is—

1. The combination, in a fish-line reel, of a spool-frame and a spool having a hollow cylindrical axis laterally perforated, and heads provided with radial grooves communicating with the interior of the hollow axis, substantially as and for the purpose set forth.

2. In a fish-line reel, the combination of the hollow cylindrical shaft E, open at one end and laterally perforated, and the perforated sleeve I, surrounding said shaft and separated therefrom by an air-space J, substantially as and for the purpose set forth.

CHARLES F. LOOMIS.

Witnesses:
SAM H. LESSEY,
CHAS. E. CLARK.